US010222622B2

(12) United States Patent
Drinkwater et al.

(10) Patent No.: US 10,222,622 B2
(45) Date of Patent: Mar. 5, 2019

(54) HEAD MOUNTED DISPLAYS WITH SHAPED LENSES

(71) Applicant: FACEBOOK TECHNOLOGIES, LLC, Menlo Park, CA (US)

(72) Inventors: Jared I. Drinkwater, Auburn, WA (US); Mark Alan Tempel, Sammamish, WA (US); Robin Michael Miller, Redmond, WA (US); Joseph Patrick Sullivan, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 11 days.

(21) Appl. No.: 14/984,242

(22) Filed: Dec. 30, 2015

(65) Prior Publication Data

US 2017/0192240 A1    Jul. 6, 2017

(51) Int. Cl.
*G02B 27/01* (2006.01)

(52) U.S. Cl.
CPC ..... *G02B 27/0176* (2013.01); *G02B 27/0172* (2013.01); *G02B 2027/0134* (2013.01); *G02B 2027/0154* (2013.01); *G02B 2027/0178* (2013.01)

(58) Field of Classification Search
CPC .... G02B 2027/0178; G02B 2027/0154; G02B 2027/0134; G02B 27/017; G02B 27/0172; G02B 27/0176; G02C 5/045
See application file for complete search history.

(56) References Cited

U.S. PATENT DOCUMENTS

| | | | |
|---|---|---|---|
| 2002/0137571 A1* | 9/2002 | McMahon | A63B 69/3608 473/210 |
| 2012/0075168 A1* | 3/2012 | Osterhout | G02B 27/017 345/8 |
| 2015/0253574 A1* | 9/2015 | Thurber | G02B 27/0172 359/630 |

* cited by examiner

*Primary Examiner* — Marin Pichler
(74) *Attorney, Agent, or Firm* — FisherBroyles, LLP

(57) ABSTRACT

Head mounted displays having lens movement assemblies and associated systems and methods are disclosed herein. In one embodiment, a head mounted display system includes a display housing surrounding one or more display devices, a first lens and a second lens. An input device on the display housing includes a control member moveable between a first position and a second position. A lens movement assembly is operatively coupled to the input device and the first and second lenses, and is configured to move the first lens relative to the second lens in response to movement of the control member between the first position and the second position.

19 Claims, 5 Drawing Sheets

HEAD MOUNTED DISPLAYS WITH SHAPED LENSES

TECHNICAL FIELD

This patent application is generally directed to head mounted displays and, more specifically, to head mounted displays having one or more lenses.

BACKGROUND

Human eyes are recessed relative to the nose and eyebrow areas and are separated by an interpupillary distance. The distance between the left eye and the right eye and the distances from the nose and/or eyebrow area, such as the supraorbital process, can cause each eye to have a slightly different view. The human brain can combine the different views from the left and right eye to form a three-dimensional image. Disparities between the left eye view and the right eye view can provide depth cues that can be used by the brain to perceive depth in the three-dimensional image. A typical head mounted display includes a flat display panel and a circular lens for each eye. A user wearing the head mounted display can view the display panels through each circular lens and the user's brain can combine the separate images to form a three dimensional image. The user's nose and supraorbital processes over the eyes, however, often require that the circular lenses be spaced further away from the user's eyes. This can negatively impact a user's special perception, particularly in the peripheral regions of the user's view, when the user is wearing the head mounted display, which can lead to inaccurate or uncomfortable viewing.

SUMMARY

In one embodiment of the present technology, a head mounted display assembly is wearable by a user having a face with eyes, eye brow areas generally over the eyes, and a nose. The assembly comprises a display housing with a central axis generally alignable with the user's nose and between the user's eyes and eye brow areas. One or more displays are in the display housing, and non-circular first and second lenses are in the display housing on opposing sides of the central axis and adjacent to the one or more displays. The first and second lenses have center portions that define a longitudinal axis substantially normal to the central axis. Each lens has a medial vertex above the longitudinal axis, and has an angled nasal relief area extending between the medial vertex and an inferior vertex below the longitudinal axis. The nasal relief area is configured to be adjacent to the user's nose when the user wears the head mounted display. Each of the first and second lenses have an angled brow relief area extending between the medial vertex and a superior vertex above the longitudinal axis. The brow relief area is configured to be positioned generally below the user's eyebrow area immediately adjacent to the user's eye.

In another embodiment, a head mounted display assembly is provided that is wearable by a user having a face with eyes, eye brow areas generally over the eyes, and a nose. The assembly has a display housing with a central axis, and non-circular first and second lenses are in the display housing on opposing sides of the central axis. The first and second lenses are positioned along a longitudinal axis substantially normal to the central axis. Each of the first and second lenses have a nasal relief area extending between a medial-most portion and a bottom-most portion, wherein the medial-most portion is closest to the central axis and is above the longitudinal axis. The medial-most portion of each lens can be an arcuate medial vertex. The bottom-most portion is below the longitudinal axis, and in at least one embodiment, the bottom-most portion is an arcuate inferior vertex. Each lens has a brow relief area extending between the medial-most portion and a top-most portion that is configured to be positioned generally below the user's eyebrow area. The top-most portion of at least one embodiment is an arcuate superior vertex. The nasal relief and brow relief areas each diverge from the central axis relative to the longitudinal axis.

In yet another embodiment, a head mounted display assembly is provided for use by a user having a face with eyes, a nose with a nasal bone generally between the eyes, and a brow area with supraorbital processes generally over the eyes. The assembly comprises a display housing having a face-engaging area positionable against the user's face around the eyes. The display housing has a central axis generally alignable with the user's nose and between the user's eyes and supraorbital processes. A display device assembly is in the display housing and has one or more displays. First and second lenses are coupled to the display device assembly in the display housing on opposing sides of the central axis and positioned to be between the display assembly and the user's eyes. The first and second lenses have centers aligned with each other to define longitudinal axis substantially normal to the central axis. Each of the first and second lenses have a non-circular perimeter shape with an arcuate medial vertex defining a portion of the lens closest to the central axis. The medial vertex is above the longitudinal axis. Each lens also has arcuate inferior and superior vertices on opposing sides of the longitudinal axis. The inferior vertex is below the longitudinal axis and positioned further away from the central axis than the medial vertex to define a nasal relief area configured to be adjacent to a portion of the user's nose and nasal bone. The superior vertex is above the longitudinal axis and positioned further away from the central axis than the medial vertex to define a brow relief area configured to be adjacent to a portion of the user's supraorbital process. Each lens is shaped and sized to allow the lenses to be closest to the user's eyes for viewing the display assembly through the lenses when the user wears the head mounted display assembly.

BRIEF DESCRIPTION OF THE DRAWINGS

Embodiments of the head mounted displays introduced herein may be better understood by referring to the following Detailed Description in conjunction with the accompanying drawings, in which like reference numerals indicate identical or functionally similar elements.

Figure 1:
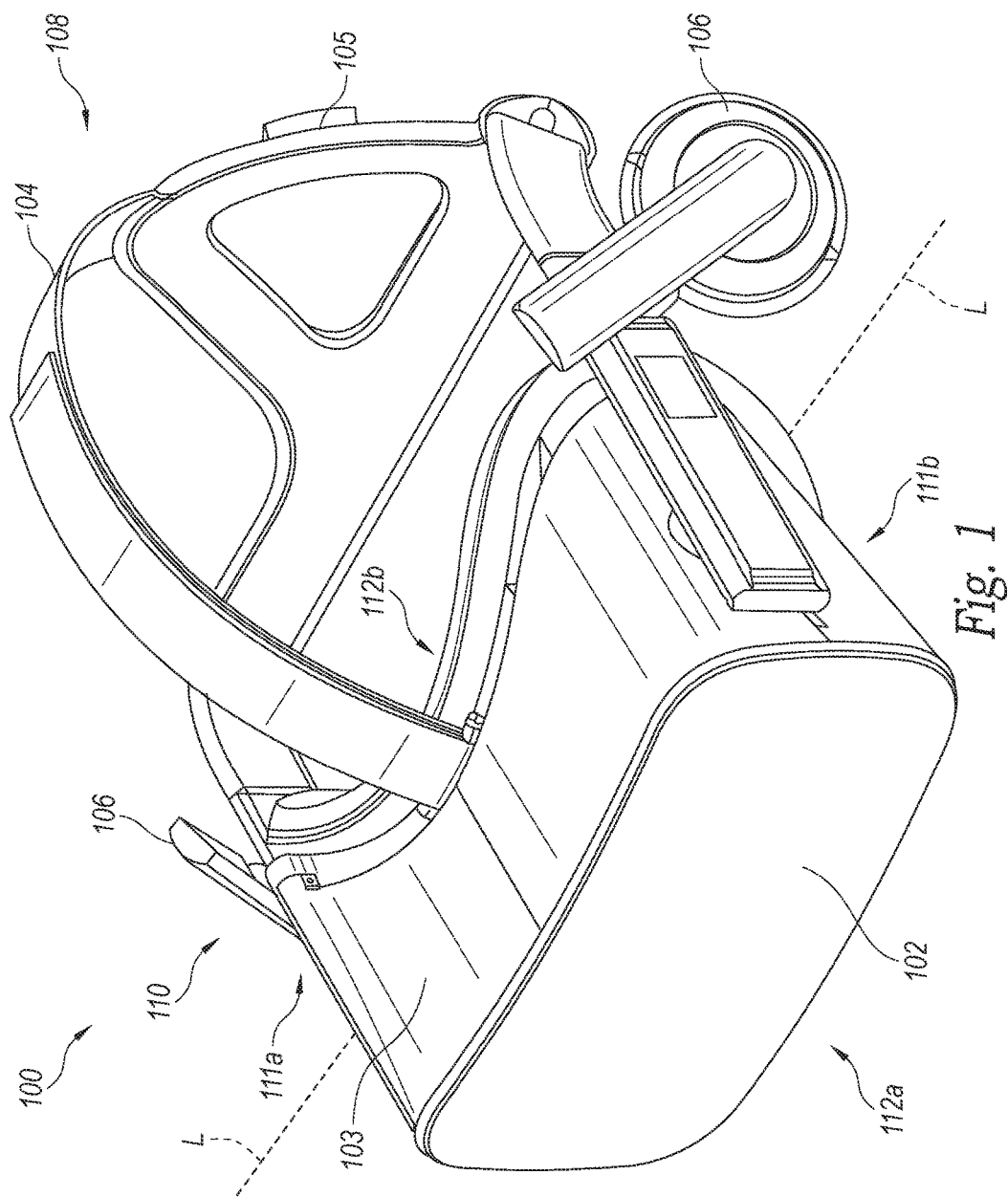
FIG. 1 is an isometric front view of a head mounted display system in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

Shaped viewing lenses were disclosed. A head mounted display includes a planar screen and a pair of lenses positioned next to the screen. When mounted on a user's head, the lenses are positioned in front of the user's eyes. It is beneficial for the lenses to be as close to the user's eyes as possible. Each lens includes a nose relief corresponding to the user's nose and a brow relief corresponding to a user's eye brow.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a head mounted display assembly 100 in accordance with an embodiment of the present disclosure. The head mounted display assembly 100 includes a pair of earphone assemblies 106, a strap assembly 108 and an enclosure or a display housing 110. The strap assembly 108 includes an adjustable strap 104 extending from the display housing 110 to a support portion 105 configured to be worn on a user's head and to support the head mounted display assembly 100 thereon. The display housing 110 includes a front cover 102 and an exterior surface 103. The display housing 110 extends between a first end portion 111a (e.g., a right side portion) and a second end portion 111b (e.g., a left side portion). The display housing 110 further extends between distal and proximal end portions 112a and 112b, respectively. When a user is wearing the head mounted display assembly 100, the distal end portion 112a corresponds to a front portion of the display housing 110 located farthest from a user's face, and the proximal end portion 112b corresponds to a rear portion of the display housing 110 forming a face-engaging portion located closer or adjacent to the user's face.

In operation, the user places the support portion 105 on the back of his or her head and adjusts the strap 104 in order to position the proximal end portion 112b of the display housing 110 snugly against the user's face generally around and in front of the user's eyes. As explained in further detail below, the display housing 110 contains one or more optical assemblies having two optical lenses coupled to one or more corresponding displays. Embodiments of the present disclosure can include a display housing 110 can having a lens movement assembly configured to move at least one of the lenses in the display housing 110 relative to the other lens. The lens movement assembly of at least one embodiment is disclosed in U.S. patent application Ser. No. 14/877,848, titled LENS MOVEMENT ASSEMBLIES FOR USE WITH HEAD MOUNTED DISPLAYS, and filed Oct. 7, 2015, and which is incorporated herein in its entirety by reference thereto.

Figure 2:
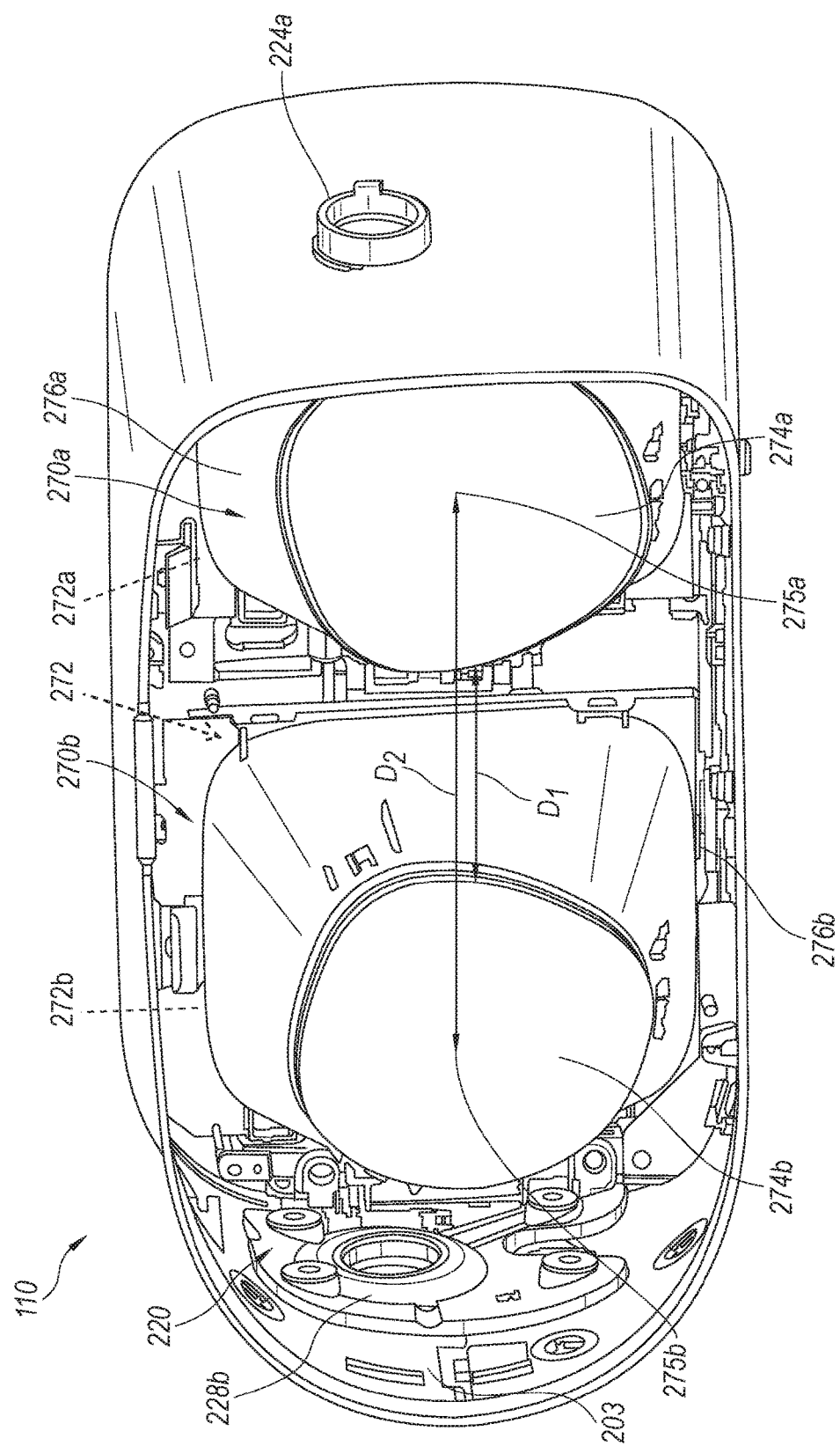
FIG. 2 is a left rear view of the display housing of FIG. 1.
Figure 3:
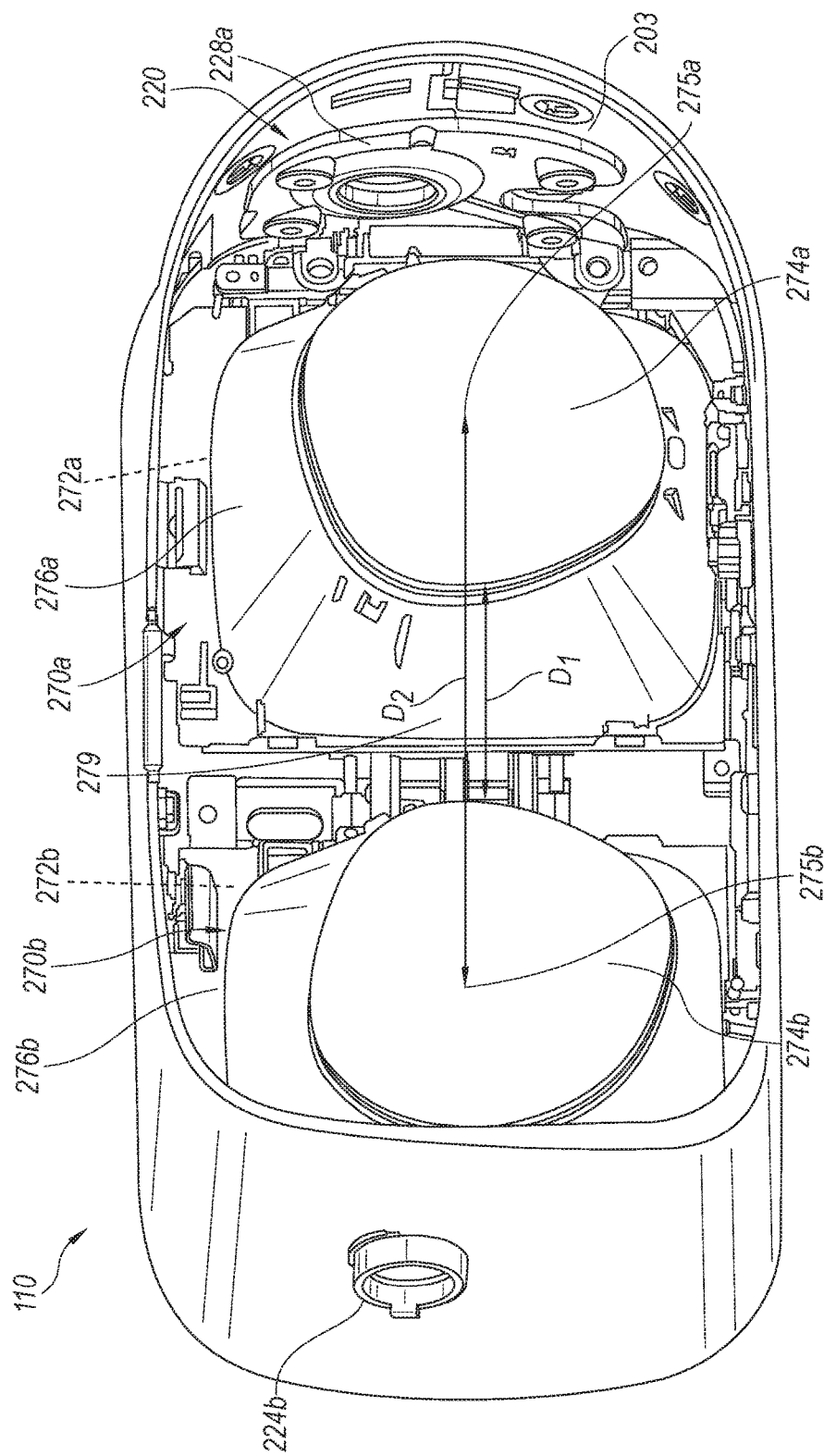
FIG. 3 is a right rear view of the display housing of FIG. 1.

FIGS. 2 and 3 are corresponding left and right rear views of the display housing 110 of FIG. 1. The display housing 110 contains a pair of spaced apart optical assemblies 270 (referred to individually as a first optical assembly 270a and a second optical assembly 270b) coupled to a lens movement assembly 250 configured to move at least a portion of the individual optical assemblies 270a and 270b relative to the display housing 110 in response to user input received at an input device to adjust the position of one or both of the optical assemblies relative to a user's eyes. A support structure 220 attaches the optical assemblies 270 to the display housing 110. In the illustrated embodiment, the support structure 220 is connected to the display housing 110 by the first support member 224a (FIG. 2) and a second support member 224b (FIG. 3) extending through corresponding apertures in the first and second end portions 111a and 111b, respectively of the display housing 110. In some embodiments, the first support member 224a and the second support member 224b can be configured, for example, to receive corresponding portions of the earphone assemblies 106 (FIG. 1). In the illustrated embodiment, the support structure 220 includes a first bracket 228a (FIG. 3) and a second bracket 228b (FIG. 2) that attach the support structure 220 to an interior surface 203 of the display housing 110, so as to support the optical assemblies 270 within the display housing 110.

The optical assemblies 270 include one or more corresponding displays 272 (referred to individually as a first display panel 272a and a second display panel 272b) coupled to corresponding spaced apart lenses 274 (referred to individually as a first lens 274a and a second lens 274b) by hollow lens cups 276 (referred to individually as a first lens cup 276a and a second lens cup 276b) such that the lenses 274 are between the displays 272 and the user's eyes. The lens cups 276 are truncated, generally conical, opaque vision shields positioned between the lenses 274 and the corresponding displays 272 that hold the lenses 274 apart from the corresponding displays 272a and 272b by a predetermined distance in an axial direction extending between the distal and proximal end portions 112a and 112b. In the illustrated embodiment, the axial distance between the lenses 274 and the corresponding displays 272 is in the range of about 20 mm to about 50 mm, inclusive.

The first and second optical assemblies 270a and 270b are also laterally spaced apart from each other in a direction generally parallel to a longitudinal axis of the display housing 110, such that the inner most edges of the first and second lenses 274a and 274b are spaced apart by a first distance $D_1$. In the illustrated embodiment, the first distance $D_1$ is in the range of about 10 mm to 30 mm, inclusive. The lenses 274 are shaped and sized so that center portions 275 (referred to individually as a first center portion 275a and a second center portion 275b) of the lenses 274 are laterally spaced apart by an interaxial distance or a second distance $D_2$, which can be in the range of about 40 mm to 100 mm inclusive. In one or more embodiments, the distance $D_2$ is between about 50 mm and 80 mm, or between about 60 mm and 70 mm, or between about 62 mm and 65 mm, inclusive.

Figure 4:
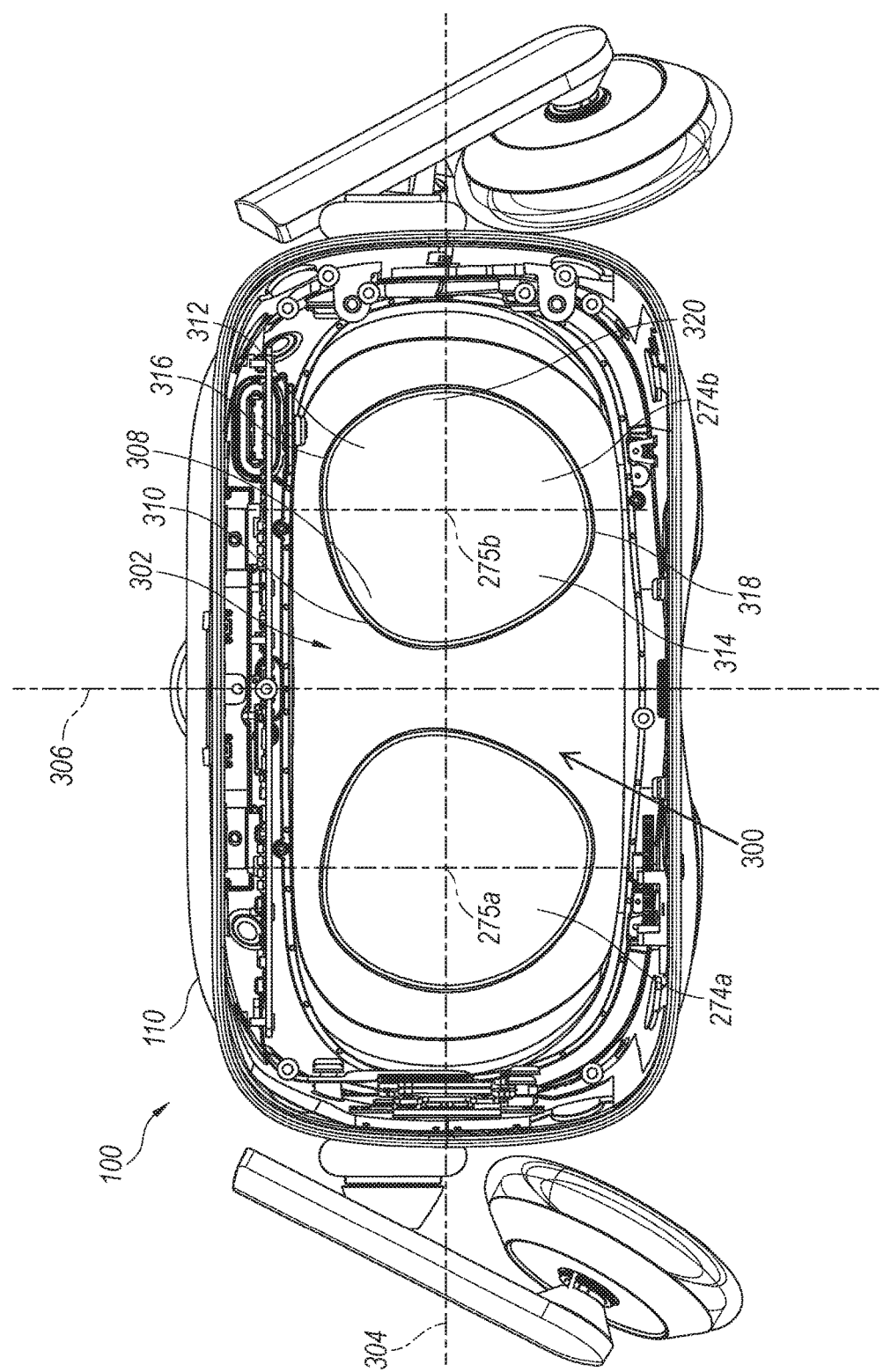
FIG. 4 is a partially cut-away front elevation view of the head mounted display with several components not shown in order to avoid obscuring the left and right lenses in the display housing.
Figure 5:
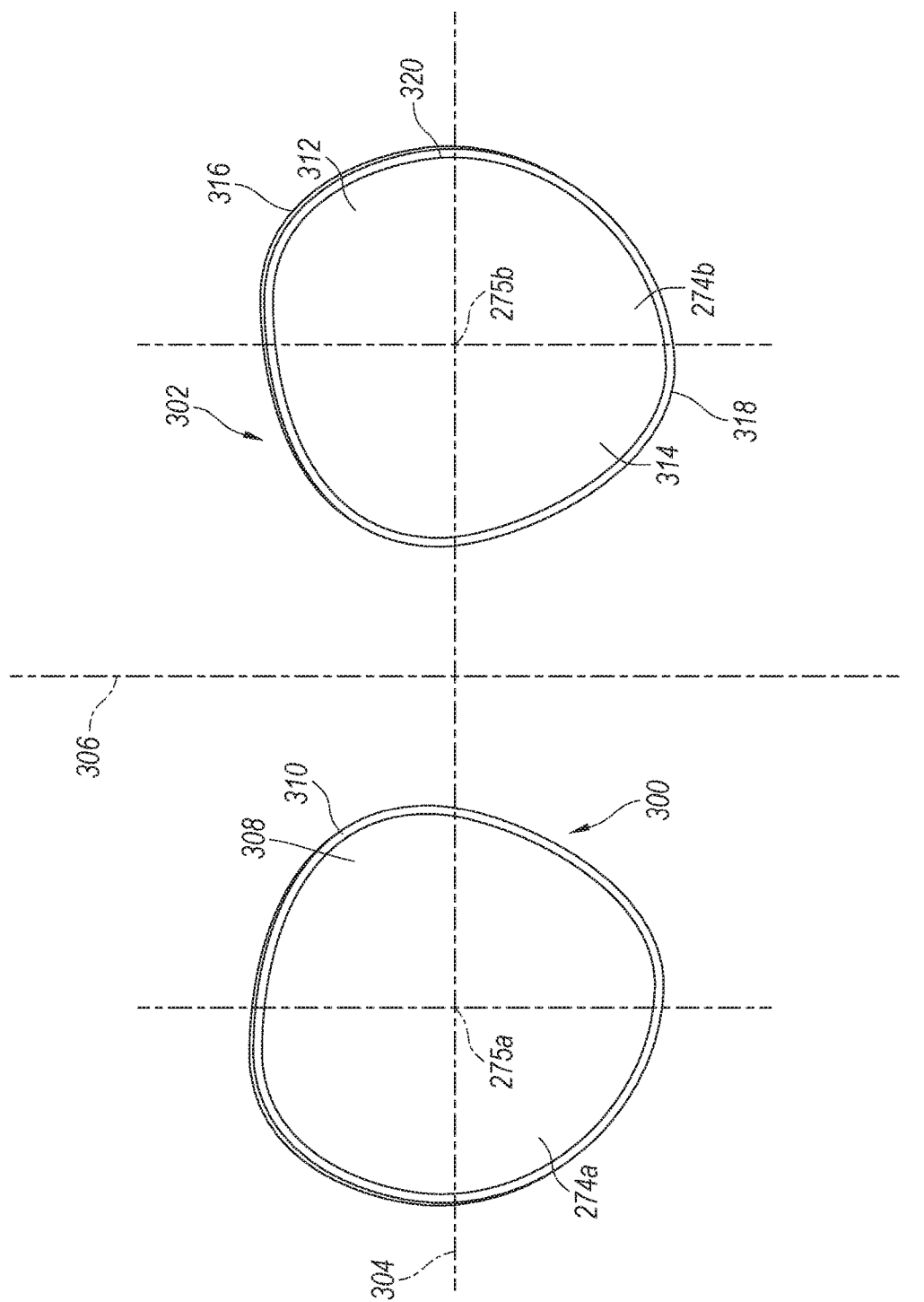
FIG. 5. is an elevation view of the lenses of FIG. 4 shown removed from the head mounted display.

FIG. 4 is a partially cut-away front elevation view of the head mounted display showing the first and second lenses 274a and 274b in the display housing 110, and FIG. 5 shows the lenses removed from the display housing 110 for purposes of clarity. Each of the first and second lenses 274a and 274b are non-circular lenses with peripheral portions that extend downwardly from contoured medial portions 308 to define a generally downwardly diverging nasal relief area 300 configured to receive a user's nose therein. The lenses' peripheral portions also extend upwardly from the contoured medial portions 308 to define a generally upwardly diverging brow relief area 302 configured to be positioned in the user's brow region below the supraorbital processes. The shape of the lenses 274 allow the lenses 274 to fit closely the user's face substantially immediately adjacent to the user's eyes when wearing and using the head mounted display assembly 100.

The center portions 275a and 275b of the lenses 274a and 274b are disposed along a longitudinal axis 304 and on opposing sides of a central axis 306 that generally aligns with the user's nose and is substantially normal to the longitudinal axis 304. Each lens 274a and 274b has a non-circular perimeter shape defined by a contoured medial portion 308 having an arcuate medial vertex 310 defining a portion of the lens closest to the central axis 306. The medial vertex 310 of each illustrated lens 274a/b is above the longitudinal axis 304.

Each lens 274a and 274b also has upper and lower portions 312 and 314 on opposing sides of the longitudinal axis 304. The upper portion 312 has an upper-most portion with an arcuate superior vertex 316 positioned further from the central axis 306 than the medial vertex 310 to define the brow relief area 302 that will be below and immediately adjacent to a portion of the user's supraorbital process. In the illustrated embodiment, the superior vertex 316 is spaced further away laterally from the central axis 306 than the center portions 275a and 275b of respective lens 274a and 274b. The lower portion 314 of each lens 274a and 274b has a lower-most portion with an arcuate inferior vertex 318 also spaced further from the central axis 306 than the medial vertex 310 to define the nasal relief area 300 positioned to be immediately adjacent to a portion of the user's nose and associated nasal bone. The illustrated inferior vertex 318 is closer to the central axis 306 that the lenses' center portions 275a and 275b. Accordingly, this non-circular shape of the lenses 274 allows the lenses to be closest to the user's eyes for viewing the display will panels 272 when the user wears the head mounted display assembly 100.

In the illustrated embodiment, the superior vertex 316 of each lens 274a and 274b is spaced further from the central axis 306 than the inferior vertex 318. Each lens 274a and 274b also has an arcuate lateral vertex 320 that can be approximately coincident with the longitudinal axis 304 and is furthest from the central axis 306. The lateral vertex is also closer to the longitudinal axis 304 than the medial vertex 310. The lenses 274 are shaped and sized to fit closely to the users face immediately adjacent to the user's eyes while providing consistent and accurate viewing in the peripheral view regions through the portions of the lenses 274 above, below, and/or lateral of the center portions 275 of the lenses 274. In a virtual reality head-mounted display assembly, such improved vision to the displays provides a significant befit for the user's virtual reality experience.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A head mounted display assembly wearable by a user having a face with eyes, eye brow areas generally over the eyes, and a nose, comprising:
    an enclosed display housing having an enclosed interior area, a front cover, a proximal end portion forming a face-engaging portion, and an exterior surface connected to the front cover, the front cover defining a distal end portion of the display housing, the display housing having a central axis generally alignable with the user's nose and between the user's eyes and eye brow areas;
    an adjustable head strap attached to the display housing;
    one or more displays in the interior area and contained within the enclosed display housing and proximal of the front cover;
    non-circular first and second lenses in the interior area and contained within the enclosed display housing and proximal of the one or more displays, the non-circular first and second lenses on opposing sides of the central axis, the first and second lenses defining a longitudinal axis substantially normal to the central axis, each of the first and second lenses having a medial vertex above the longitudinal axis, and having an angled nasal relief area extending between the medial vertex and an inferior vertex below the longitudinal axis and configured to be adjacent to the user's nose when the user wears the head mounted display, each of the first and second lens having an angled brow relief area extending between the medial vertex and a superior vertex above the longitudinal axis and configured to be positioned generally below the user's eyebrow area immediately adjacent to the user's eye, the superior vertex being spaced laterally further from the longitudinal axis than the medial vertex such that the angled brow relief area defines a supraorbital shape configured to conform to the user's supraorbital process and situate the lens substantially immediately adjacent to the user's eye; and first and second lens cups in the interior area and contained within the enclosed display housing, the first lens cup being hollow and attached to the first lens and the second lens cup being hollow and attached to the second lens, wherein the first and second lens cups with the respective first and second lenses are movable laterally within the enclosed interior area of the display housing relative to the central axis to adjust the distance between the medial vertices of the first and second lens, and wherein the first and second lens cups are substantially opaque vision shields between the first and second lenses and the one or more displays that hold the first and second lenses axially apart from or more displays by a selected distance with the first and second lens cups extending between the one or more displays and the respective first and second lenses.

2. The assembly of claim 1 wherein the superior vertex of each lens is spaced further from the central axis than the inferior vertex of the respective lens.

3. The assembly of claim 1 wherein each lens has a lateral vertex closer to the longitudinal axis than the medial vertex.

4. The assembly of claim 1 wherein each lens has a lateral vertex substantially coincident with the longitudinal axis.

5. The assembly of claim 1 wherein the first lens cup supports the first lens apart from the one or more displays in the display housing, wherein the first lens cup is between the first lens and the one or more displays, and wherein the second lens cup supports the second lens apart from the one or more displays in the display housing, wherein the second lens cup is between the second lens and the one or more displays.

6. The assembly of claim 1 wherein the center of each of the first and second lenses is further from the central axis than the inferior vertex of the respective lens.

7. The assembly of claim 1 wherein the one or more displays comprise a first display coupled to the first lens and a second display coupled to the second lens.

8. A head mounted display assembly wearable by a user having a face with eyes, eye brow areas generally over the eyes, and a nose, comprising:

an enclosed display housing having a central axis, an enclosed interior area, a front cover, a proximal end portion forming a face-engaging portion, and an exterior surface connected to the front cover, the front cover defining a distal end portion of the display housing;

non-circular first and second lenses in the interior area and contained within the enclosed display housing proximal of the front cover and on opposing sides of the central axis, the first and second lenses defining a longitudinal axis substantially normal to the central axis, each of the first and second lenses having a nasal relief area extending between a medial-most portion and a bottom-most portion, wherein the medial-most portion is closest to the central axis and is above the longitudinal axis, and the bottom-most portion is below the longitudinal axis, and each lens having a brow relief area extending between the medial-most portion and a top-most portion configured to be positioned generally below the user's eyebrow area, the top-most portion being spaced laterally further from the longitudinal axis than the medial-most portion such that the top-most portion defines a supraorbital shape configured to conform to the user's supraorbital process and situate the lens substantially immediately adjacent to the user's eye, wherein each of the nasal relief area and the brow relief area diverge from the central axis relative to the longitudinal axis;

a display assembly in the interior area and contained within the enclosed housing with one or more displays positioned to be viewed within the enclosed housing and through the first and second lenses, the display assembly being between the front cover and the first and second lenses; and first and second lens cups in the interior area and contained within the enclosed display housing between the display assembly and the first and second lenses, the first lens cup being hollow and fixedly attached to the first lens and the second lens cup being hollow and fixedly attached to the second lens, wherein the first and second lens cups with the respective first and second lenses are supported within the enclosed interior area of the display housing, and wherein the first and second lens cups are substantially opaque vision shields between the first and second lenses and the display assembly with the first and second lens cups extending between the display assembly and the respective first and second lenses, and the first and second lenses are laterally movable within enclosed Interior area in the display housing relative to the central axis to change the distance between the medial most portions of the first and second lenses.

9. The assembly of claim 8 wherein the top-most portion is a superior vertex of each lens, and the bottom-most portion is an inferior vertex of each lens.

10. The assembly of claim 8 wherein each lens has a lateral-most portion closer to the longitudinal axis than the medial-most portion.

11. The assembly of claim 8 wherein the medial-most portion of each lens is an arcuate medial vertex.

12. The assembly of claim 8 wherein the center of each of the first and second lenses is further from the central axis than the bottom-most portion of the respective lens.

13. A head mounted display assembly for use by a user having a face with eyes, a nose with a nasal bone generally between the eyes, and a brow area with supraorbital processes generally over the eyes, the assembly comprising:

a display housing having a face-engaging portion positionable against the user's face around the eyes, the display housing having a central axis generally alignable with the user's nose and between the user's eyes and supraorbital processes, the display housing having an enclosed interior area, a front cover, a proximal end portion forming the face-engaging portion, and an exterior surface connected to the front cover, the front cover defining a distal end portion of the display housing;

an adjustable head strap coupled to the display housing and configured fit onto the head of the user;

a display device assembly in the display housing and having one or more displays within the enclosed interior area and proximal to the front cover;

first and second lenses within the enclosed interior area and contained within the display housing proximal of the display device assembly, the first and second lenses being coupled to the display device assembly in the display housing on opposing sides of the central axis and positioned to be between the display assembly and the user's eyes, the first and second lenses having centers aligned with each other to define longitudinal axis substantially normal to the central axis, each of the first and second lenses having a non-circular perimeter shape with an arcuate medial vertex defining a portion of the lens closest to the central axis, wherein the medial vertex is above the longitudinal axis, and having arcuate inferior and superior vertices on opposing sides of the longitudinal axis, wherein the inferior vertex is below the longitudinal axis and positioned further away from the central axis than the medial vertex to define a nasal relief area configured to be adjacent to a portion of the user's nose and nasal bone, and the superior vertex is above the longitudinal axis and positioned further away from the central axis than the medial vertex to define a brow relief area configured to be adjacent to a portion of the user's supraorbital process, the superior vertex is spaced laterally further from the longitudinal axis than the medial vertex, wherein each lens is configured to conform to the user's supraorbital processes and allow the lenses to be substantially immediately adjacent to the user's eyes for viewing the display assembly through the lenses when the user wears the head mounted display assembly; and a first lens cup attached to the first lens and a second lens cup attached to the second lens, the first and second lens cups being in the enclosed interior area and contained within the display housing, wherein the first and second lens cups with the respective first and second lenses are supported within the enclosed interior area of the display housing in a position between the display device assembly and the first and second lenses, and wherein the first and second lens cups are substantially opaque vision shields between the first and second lenses and the display device assembly with the first and second lens cups extending between the display assembly and the respective first and second lenses, and the first and second lenses are movable laterally within the display housing relative to the central axis to adjust the distance between the medial vertices of the first and second lens.

14. The assembly of claim 13 wherein the superior vertex of each lens is spaced further from the central axis than the inferior vertex of the respective lens.

15. The assembly of claim 13 wherein each lens has an arcuate lateral vertex spaced further from the central axis than the medial vertex.

16. The assembly of claim 13 wherein each lens has an arcuate lateral vertex substantially coincident with the longitudinal axis.

17. The assembly of claim 13 wherein the first lens cup supports the first lens apart from the one or more displays in the display housing, wherein the first lens cup is between the first lens and the one or more displays, and wherein the second lens cup supports the second lens apart from the one or more displays in the display housing, wherein the second lens cup is between the second lens and the one or more displays.

18. The assembly of claim 13 wherein the center of each of the first and second lenses is further from the central axis than the inferior vertex of the respective lens.

19. The assembly of claim 13 wherein display device assembly has a first display coupled to the first lens and a second display coupled to the second lens.

\* \* \* \* \*